(12) United States Patent
Arora et al.

(10) Patent No.: US 9,088,686 B2
(45) Date of Patent: Jul. 21, 2015

(54) VIDEO SIGNAL SWITCHING

(71) Applicant: BROADCOM CORPORATION, Irvine, CA (US)

(72) Inventors: Gaurav Arora, Northborough, MA (US); Adil Jagmag, Hollis, NH (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 14/181,572

(22) Filed: Feb. 14, 2014

(65) Prior Publication Data

US 2014/0160357 A1    Jun. 12, 2014

Related U.S. Application Data

(63) Continuation of application No. 13/013,421, filed on Jan. 25, 2011, now Pat. No. 8,675,138.

(60) Provisional application No. 61/364,463, filed on Jul. 15, 2010.

(51) Int. Cl.

| | |
|---|---|
| H04N 5/268 | (2006.01) |
| H04N 5/46 | (2006.01) |
| H04N 7/08 | (2006.01) |
| H04N 21/438 | (2011.01) |
| H04N 21/44 | (2011.01) |
| H04N 21/462 | (2011.01) |
| H04N 21/81 | (2011.01) |

(52) U.S. Cl.
CPC ............... *H04N 7/08* (2013.01); *H04N 5/268* (2013.01); *H04N 21/4384* (2013.01); *H04N 21/44008* (2013.01); *H04N 21/4622* (2013.01); *H04N 21/812* (2013.01)

(58) Field of Classification Search
CPC ....... H04N 5/268; H04N 7/08; H04N 21/812; H04N 21/4384; H04N 21/4622; H04N 21/44008
USPC ......... 348/705, 706, 553–558, 510, 515, 516, 348/568, 569
See application file for complete search history.

(56) References Cited

U.S. PATENT DOCUMENTS

| | | | |
|---|---|---|---|
| 6,320,623 B1 | 11/2001 | Cavallerano et al. | |
| 2003/0043789 A1* | 3/2003 | Okajima et al. | ............... 370/360 |
| 2004/0218269 A1 | 11/2004 | Divelbiss et al. | |
| 2006/0294574 A1 | 12/2006 | Cha | |
| 2007/0242160 A1* | 10/2007 | Garg et al. | .................... 348/565 |

* cited by examiner

*Primary Examiner* — Michael Lee
(74) *Attorney, Agent, or Firm* — McDermott Will & Emery LLP

(57) ABSTRACT

A method and system are provided in which a processor may perform fast source switching and/or automatic source switching by keeping active the signals from multiple sources. The processor may determine which received video signals are locked-in within a front-end portion of the processor. A video signal may be locked-in when a demodulator is locked to a carrier in the video signal or when a decoder is programmed to decode the video signal. During operation, the processor may switch from processing a current video signal to processing a video signal selected from those determined to be locked-in. The processor may maintain active a portion of a back-end portion of the processor to handle the switch from the current video signal to the selected video signal. The processor may switch to process between video signals when a predetermined content and/or metadata is detected within one of the video signals.

20 Claims, 10 Drawing Sheets

VIDEO SIGNAL SWITCHING

CROSS-REFERENCE TO RELATED APPLICATIONS/INCORPORATION BY REFERENCE

This application is a continuation of U.S. patent application Ser. No. 13/013,421, filed Jan. 25, 2011, entitled "Method and Apparatus for Fast Source Switching and/or Automatic Source Switching," now issued as U.S. Pat. No. 8,675,138, which claims priority to and makes reference to U.S. Provisional Patent Application Ser. No. 61/364,463, filed on Jul. 15, 2010, entitled "Method and Apparatus for Fast Source Switching and/or Automatic Source Switching."

The above stated applications are hereby incorporated herein by reference in their entirety.

FIELD OF THE INVENTION

Certain embodiments of the invention relate to processing of video signals. More specifically, certain embodiments of the invention relate to a method and system for providing fast source switching and/or automatic source switching.

BACKGROUND OF THE INVENTION

The delivery of video content through television services typically includes conventional mechanisms for transmitting television signals such as traditional radio frequency broadcasts, satellite broadcasts, and various cable television (CATV) formats, for example. Another method, one that is becoming more commonplace, is Internet Protocol television (IPTV), which allows video content to be provided through television services or other services over a packet-switched network infrastructure utilizing Transport Control Protocol/Internet Protocol (TCP/IP) and/or related protocols.

While a television is generally capable of receiving radio frequency broadcasts, a set-top-box or other similar device may be used to receive video content delivered through other transmission mechanisms. For example, the set-top-box may receive and process signals from satellite broadcasts or in a CATV format. The processed signals may then be communicated to a television where video images may be displayed and the audio associated with the video images reproduced. In addition, a digital video recorder (DVR) or personal video recorder (PVR) may also be used to deliver video content to a television by playing back digitally recorded video images and/or audio. Accordingly, video content may be provided to a television and/or to similar devices through a variety of services, in multiple formats, and from a wide range of sources.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for fast source switching and/or automatic source switching, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
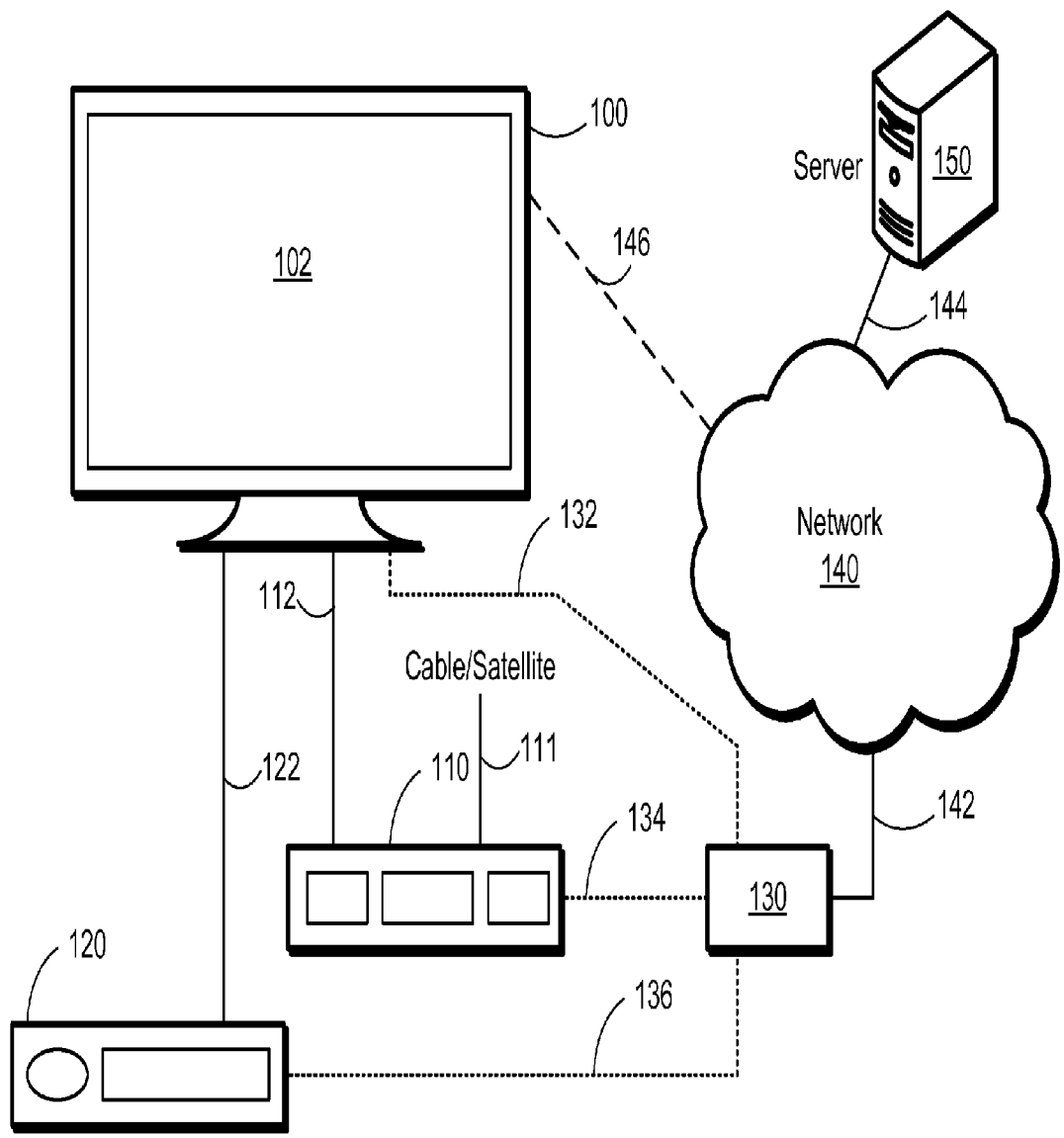
FIG. 1 is a block diagram of an exemplary system for delivering multiple video signals to a display unit, in accordance with an embodiment of the invention.

Certain embodiments of the invention may be found in a method and system for providing fast source switching and/or automatic source switching. A processor may perform fast source switching and/or automatic source switching by keeping active video signals received from multiple sources. Examples of video signals that may be received and processed by the processor include, but need not be limited to, a composite, blanking, and sync (CVBS) signal, a separate video (S-video) signal, a high-definition multimedia interface (HDMI) signal, a component signal, a personal computer (PC) signal, a source input format (SIF) signal, and a red, green, blue (RGB) signal.

The processor may determine which of the various video signals that are received may be locked-in within a front-end portion of the processor. For example, a video signal may be locked-in when a demodulator is locked to a carrier in the video signal or when a decoder is programmed to decode the video signal. During operation, the processor may switch from processing a current video signal to processing a video signal selected from those determined to be locked-in. For example, the processor may switch from processing an HDMI signal to processing a component signal that was previously determined to be locked-in within the front-end portion of the processor. The processor may maintain active at least a portion of a back-end portion of the processor to handle the switch from the current video signal to the selected video signal. The processor may switch processing from one video signal to another video signal when a predetermined content and/or metadata is detected within one of the video signals.

The processor may be a device that is operable to process signals comprising video and/or still image data, audio data, and/or multimedia data, which may be received in multiple formats and/or from a wide range of sources. In a television, for example, a digital television system-on-chip (DTV SoC) may be utilized to process one or more signals comprising video and/or still image data, audio data, and/or multimedia data. In this regard, video content may be provided from a particular source to a DTV SoC through a video signal that comprises, for example, image data and/or audio data associated with the video content.

Switching between video signals from different sources may take a considerable amount of time. In a typical television middleware stack, the switching between video signals is handled by completely breaking down a streaming pipeline within a processing device that handles a current video signal and setting up a new streaming pipeline for a next video signal. To switch from an HDMI signal to a component signal (e.g., YPrPb) or to a Moving Picture Experts Group (MPEG)/H.264 signal, for example, the switching time may be as long as two to three seconds, most of which is spent locking to the video signal. Such a long switching time may be quite noticeable, and maybe even visually unpleasant, to a user.

To reduce the switching time, the streaming pipeline in a processing device need not be completely switched off or torn down. Instead, at least a portion of the streaming pipeline in the processing device may be maintained active for multiple video signals to enable fast switching. In this manner, it may be possible to reduce the video signal switch time to be a fraction of what it is now typically possible. The remaining portion of the streaming pipeline that is not maintained active may be disabled, that is, may be switched off or placed in an idle mode, a standby mode, or like mode, for example.

FIG. 1 is a block diagram of an exemplary system for delivering multiple video signals to a display unit, in accordance with an embodiment of the invention. Referring to FIG. 1, there is shown a display unit 100, a set-top-box 110, a digital video recorder (DVR) 120, and a network interface device 130. Also shown in FIG. 1 is a network 140 and a server 150.

The display unit 100 may comprise suitable logic, circuitry, code, and/or interfaces that may be operable to receive video signals from one or more sources and to process the received video signals. In this regard, the display unit 100 may be operable to process content, such as image data and/or audio data, comprised within such video signals. When image data and the audio data are combined in some manner within the video signal, the display unit 100 may be operable to receive the video signal and separate the image data from the audio data. Once separated, the display unit 100 may process the image data and may display the images associated with the processed image data. Moreover, the display unit 100 may process the audio data and may reproduce the audio or sound associated with the processed audio data.

When the image data and the audio data are separate within the video signal, such as when carried by separate signals within the video signal, for example, the display unit 100 need not separate the video image data from the audio data. For example, the video signal may include one or more image signals that comprise the image data. In such an instance, the display unit 100 may be operable to process the image data in the image signals to display the images associated with the processed image data. The video signal may also include one or more audio signals that comprise the audio data. In such an instance, the display unit 100 may be operable to process the audio data in the audio signals to reproduce the audio or sound associated with the processed audio data.

The display unit 100 may comprise a visual display or screen 102 that may be operable to display the images associated with the image data processed by the display unit 100. The screen 102 may be based on a display technology such as cathode ray tubes (CRTs), liquid crystal displays (LCDs), plasma display panels (PDPs), thin film transistor LCDs (TFT-LCDs), plasma, light emitting diode (LED), Organic LED (OLED), or other flatscreen display technology, for example. The screen 102 may support one or more aspect ratios such as a 4:3 standard aspect ratio and a 16:9 widescreen aspect ratio, for example. The display unit 100 may comprise one or more speakers (not shown) and/or may be communicatively coupled to one or more speakers (not shown), wherein the speakers may be utilized to reproduce the audio or sound associated with the audio data processed by the display unit 100.

While the display unit 100 may typically be a television, the invention need not be so limited. For example, the display unit 100 may be a monitor, a handheld device, a portable device, a stationary device, or other like device that is capable of receiving video signals from one or more sources, and processing and/or handling the content associated with the received video signals. When the display unit 100 is a television, the display unit 100 may support multiple technical standards such as digital television (DTV) and high-definition television (HDTV), for example.

The display unit 100 may receive video signals comprising image data and/or audio data from one or more sources. For example, the display unit 100 may receive video signals from traditional radio frequency broadcasts and/or may generate video signals from signals received through traditional radio frequency broadcasts. In another example, the display unit 100 may receive video signals from other sources such as the set-top-box 110, the DVR 120, and/or the network interface device 130. Each of the set-top-box 110, the DVR 120, and/or the network interface device 130 may provide one or more video signals to the display unit 100. When a single device provides multiple video signals to the display unit 100, the various video signals provided may be based on different formats, standards, and/or protocols, for example. In this regard, the video signals received by the display unit 100 may be associated with different sources when provided by different devices and/or services, and/or when based on different formats, standards, and/or protocols.

As described above, the display unit 100 may receive video signals comprising video content such as image data and/or audio data. In this regard, the display unit 100 may comprise one or more processing devices (not shown) that may be operable to process the image data and/or the audio data received by the display unit 100. For example, a processing device in the display unit 100 may process the image data comprised within a video signal such that the images associated with the image data may be displayed. Similarly, the same processing device, or another processing device in the display unit 100, may process the audio data comprised within the video signal such that the audio or sound associated with the audio data may be reproduced. The processing device in the display unit 100 may be operable to switch between processing a current video signal to processing a next video signal. In this regard, the processing device in the display unit 100 may be operable to provide fast source switching and/or automatic source switching between the various video signals received by the display unit 100. Exemplary embodiments of such processing devices are described below with respect to FIGS. 2, 3A, 3B, 4A, and 4B.

The set-top-box 110 may comprise suitable logic, circuitry, code, and/or interfaces that may be operable to receive signals from a cable or satellite operator that provides television services and/or other type of programming services. The set-top-box 110 may be operable to process the signals received from the operator to generate one or more video signals that may be communicated to the display unit 100. In this regard, the set-top-box 110 may receive signals from the cable operator or from a satellite antenna (not shown) via a link 111 and may communicate the video signals to the display unit 100 via a link 112. The links 111 and 112 may comprise, for example, suitable connectors, coaxial cables, wires, and/or optical fibers that enable wired communication to and/or from the set-top-box 110. In an embodiment of the invention, at least a portion of the link 111 and/or at least a portion of the link 112 may comprise a wireless communication link.

The DVR 120 may comprise suitable logic, circuitry, code, and/or interfaces that may be operable to digitally record and/or play back video content. For example, the DVR 120 may digitally record and/or play back image data and/or audio data. The DVR 120 may support recording and/or play back operations in one or more formats that may include, but need not be limited to, a compact disc (CD) format, a digital video disc (DVD) format, and a Blu-ray Disc (BD) format, for example. The DVR 120 may utilize a memory medium, such as a disk drive, a universal serial bus (USB) flash drive, a non-volatile memory card (e.g., secure digital (SD) memory card), and/or other type of digital storage medium in which to digitally record and/or from which to play back image data and/or audio data. In some embodiments of the invention, the DVR 120 may be a portable device or an application for a personal computer that enables capturing, storing, and/or playing back image data and/or audio data. When in a play back mode of operation, the DVR 120 may generate one or more video signals that may be communicated to the display unit 100 via a link 122. The link 112 may comprise, for example, suitable connectors, coaxial cables, wires, and/or optical fibers that enable wired communication between the DVR 120 and the display unit 100. In an embodiment of the invention, at least a portion of the link 122 may comprise a wireless communication link.

In an embodiment of the invention, some or all of the functions or operations supported by the DVR 120 may be implemented in the set-top-box 110. For example, the set-top-box 110 may receive one or more signals from the cable or satellite operator and may digitally record video content associated with the received signals. The set-top-box 110 may also play back the digitally recorded video content to generate video signals that may be communicated to the display unit 100.

In another embodiment of the invention, some or all of the functions or operations supported by the DVR 120 and some or all of the functions or operations supported by the set-top-box 110 may be implemented in the display unit 100. That is, the display unit 100 may receive video signals from the cable or satellite operator, or may generate video signals from signals received from the cable or satellite operator. Moreover, the display unit 100 may digitally record video content associated with the received signals. In this regard, the display unit 100 may play back the digitally recorded video content, display the images associated with the video content, and/or reproduce the audio or sound associated with the video content.

The network interface device 130 may comprise suitable logic, circuitry, code, and/or interfaces that may be operable to communicatively couple one or more devices to the network 140. The network 140 may be the Internet or other wide area network (WAN), for example. The network interface device 130 may be communicatively coupled to one or more of the display unit 100, the set-top-box 110, and the DVR 120 via links 132, 134, and 136, respectively. Each of the links 132, 134, and 136 may support wired and/or wireless communication between the network interface device 130 and the display unit 100, the set-top-box 110, and the DVR 120.

In an embodiment of the invention, the network interface device 130 may be a residential gateway that may comprise suitable hardware and/or software to provide some or all of the functions and/or operations of one or more of a modem (e.g., digital subscribed line (DSL) modem, cable modem, wireless cable modem), a router (e.g., wireless router), and a switch (e.g., network switch, local area network (LAN) switch).

The network interface device 130 may be utilized to provide IPTV services and/or other network-based video content delivery services to one or more of the display unit 100, the set-top-box 110, and the DVR 120 via the links 132, 134, and 136, respectively. The network interface device 130 may provide video signals to the display unit 100 in connection with the IPTV services and/or the network-based video content delivery services. Moreover, the network interface device 130 may provide signals to the set-top-box 110 and/or to the DVR 120 that may be utilized by those devices to generate video signals that may be communicated to the display unit 100 for processing. The network interface device 130 may be communicatively coupled to the network 140 via a link 142, which may support wired and/or wireless communication between the network interface device 130 and the network 140.

The server 150 may comprise suitable logic, circuitry, code, and/or interfaces that may be operable to provide video content through IPTV services and/or other network-based video delivery services. The server 150 may also provide, via the network interface device 130, data or information, other than video content, to the display unit 100, the set-top-box 110, and/or the DVR 120. For example, the server 150 may provide profile information, such as operating parameters, that may be utilized to configure one or more processing devices in the display unit 100. The server 150 may be communicatively coupled to the network 140 via a link 144, which may support wired and/or wireless communication between the server 150 and the network 140.

While a single server 150 is shown in FIG. 1, the invention need not be so limited. For example, multiple servers may be utilized for the delivery of video content to the display unit 100, the set-top-box 110, and/or the DVR 120 via the network interface device 130. In another example, one or more servers may be utilized for the delivery of data or information other than video content to the display unit 100, the set-top-box 110, and/or the DVR 120 via the network interface device 130.

Although not shown in FIG. 1, the display unit 100 may wirelessly communicate with the network 140 by utilizing a wireless protocol such as the worldwide interoperability for microwave access (WiMAX) communication protocol, for example. In this manner, IPTV services, other network-based video content delivery services, and/or data or information other than video content may be provided to the display unit 100 via a wireless link 146.

Figure 2:
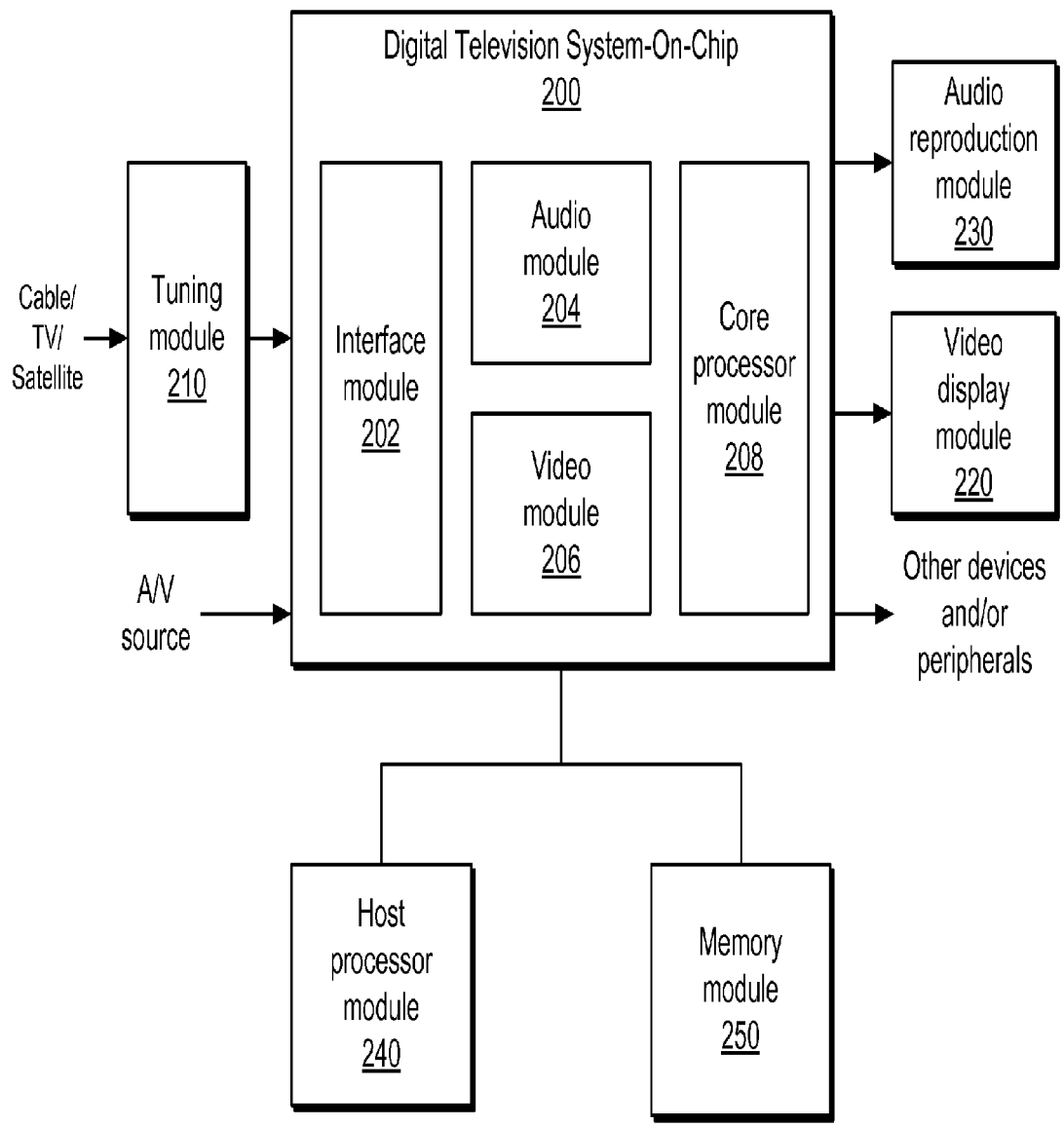
FIG. 2 is a block diagram illustrating an exemplary system for processing image data and audio data in a display unit, in accordance with an embodiment of the invention.

FIG. 2 is a block diagram illustrating an exemplary system for processing image data and audio data in a display unit, in accordance with an embodiment of the invention. Referring to FIG. 2, there is shown a digital television system-on-chip (DTV SoC) 200, a video display module 220, an audio reproduction module 230, a host processor module 240, and a memory module 250.

The DTV SoC 200 may comprise suitable logic, circuitry, code, and/or interfaces that may be operable to receive and process one or more video signals that comprise video content. Examples of video signals that may be received and processed by the DTV SoC 200 include, but need not be limited to, a CVBS signal, an S-video signal, an HDMI signal, a component signal, a PC signal, an SIF signal, and an RGB signal. The video signals may be received from a tuning module 210 and/or from one or more audio/visual (A/V) sources. The video signals received by the DTV SoC 200 may include image signals that comprise image data and/or audio signals that comprise audio data.

The processing of a video signal by the DTV SoC 200 may comprise having a portion of the DTV SoC 200 lock to a carrier signal or other like reference signal or information comprised within the video signal, for example. The DTV SoC 200 may also lock to a video signal by obtaining sufficient information from a video signal to program a decoder to decode the video signal. Once a video signal is locked-in within the DTV SoC 200, the DTV SoC 200 may enable a streaming path or streaming pipeline to be established within the DTV SoC 200 for processing the video content comprised within the video signal. For example, the DTV SoC 200 may be operable establish a streaming pipeline to process image data and/or audio data associated with the video content of the video signal.

The DTV SoC 200 may be operable to have more than one video signal concurrently locked-in within the DTV SoC 200. When the DTV SoC 200 receives more than one video signal, the DTV SoC 200 may be operable to select one or more of the received video signals for processing. Moreover, the DTV SoC 200 may be operable to switch between processing one video signal to processing another video signal already locked-in within the DRV SoC 200. The video signal switching performed by the DTV SoC 200 may based on a fast source switching operation and/or an automatic source switching operation, for example.

The video display module 220 may comprise suitable logic, circuitry, code, and/or interfaces that may be operable to receive one or more signals comprising processed image data from the DTV SoC 200 and display the images associated with the processed image data received. In this regard, the video display module 220 may correspond to a screen such as the screen 102 of the display unit 100 described above with respect to FIG. 1. The audio reproduction module 230 may comprise suitable logic, circuitry, code, and/or interfaces that may be operable to receive one or more signals from the DTV SoC 200 comprising processed audio data and reproduce the audio or sound associated with the processed audio data received. In this regard, the audio reproduction module 230 may correspond to one or more speakers of the display unit 100 and/or to one or more speakers communicatively coupled to the display unit 100.

The host processor module 240 may comprise suitable logic, circuitry, code, and/or interfaces that may be operable to control and/or configure the operation of the DTV SoC 200. For example, the host processor module 240 may be utilized to provide user-based instructions and/or other instructions to the DTV SoC 200. The memory module 250 may comprise suitable logic, circuitry, code, and/or interfaces that may be operable to store information associated with the operation of the DTV SoC 200. For example, the memory module 250 may store intermediate values associated with the processing of image data and/or audio data by the DTV SoC 200.

The tuning module 210 may comprise suitable logic, circuitry, code, and/or interfaces that may be operable to tune in to a video signal and/or to other signal received from one or more sources. For example, the tuning module 210 may be utilized to tune to a video signal and/or to other signal received from a radio frequency broadcast and/or from a set-top-box. The tuning module 210 may be utilized to tune in to more than one signal. In some embodiments of the invention, the tuning module 210 may be integrated within the DTV SoC 200. The DTV SoC 200 may be operable to receive video signals from various sources without the need for an external tuner.

The DTV SoC 200 may comprise an interface module 202, an audio module 204, a video module 206, and a core processor module 208. The interface module 202 may comprise suitable logic, circuitry, code, and/or interfaces that may be operable to receive, process, and/or select between multiple video signals received by the DTV SoC 200. For example, the interface module 202 may be utilized to switch between a video signal that is currently being processed by the DTV SoC 200 and a next video signal that is to be processed by the DTV SoC 200. In this regard, the interface module 202 may comprise one or more switches (not shown) and/or one or more multiplexers (not shown) to enable the interface module 202 to select one of the multiple video signals that may be received by the DTV SoC 200. The interface module 202 may be utilized to detect or determine when a video signal is active and/or to lock to a video signal.

The interface module 202 may be operable to lock to a carrier signal or other like reference signal or information comprised within a video signal. In this regard, the interface module 202, or other portion of the DTV SoC 200, may comprise a phase-locked loop (PLL) (not shown) or other like locking or synchronization device, that may be utilized to lock to a video signal. The interface module 202 may also be operable lock to a video signal by obtaining information from the video signal that may enable the programming of a decoder to decode the video signal.

The audio module 204 may comprise suitable logic, circuitry, code, and/or interfaces that may be operable to process audio data associated with one or more video signals. In this regard, the audio module 204 may be operable to support processing of audio data in more than one format. The video module 206 may comprise suitable logic, circuitry, code, and/or interfaces that may be operable to process image data associated with one or more video signals. In this regard, the video module 204 may be operable to support processing of image data in more than one format. In some embodiments of the invention, the functions of the audio module 204 and the video module 206 may be implemented in a single module or in multiple modules that combine audio and video processing capabilities.

The core processor module 208 may comprise suitable logic, circuitry, code, and/or interfaces that may be operable to control and/or configure the operation of the DTV SoC 200. For example, the core processor module 208 may be operable to control and/or configure operations of the DTV SoC 200 that are associated with fast source switching and/or with automatic source switching.

In operation, the DTV SoC 200 may receive multiple video signals from one or more sources such as radio frequency broadcasts, cable television services, satellite television services, IPTV services, and/or DVR or PVR playback, for example. The interface module 202 and/or the core processor module 208 in the DTV SoC 200 may be utilized to determine which of the video signals received by the DTV SoC 200 are active and/or are locked-in within the DTV SoC 200. The interface module 202 may be utilized to lock to the video signals received. One or more of the video signals determined to be locked-in may be selected through the interface module 202, and the DTV SoC 200 may process the one or more selected video signals. Those video signals known to be inactive need not be considered when making such selection. When a new video signal is selected, the DTV SoC may switch from processing a current video signal to processing the new video signal selected. In carrying out such a switch, the DTV SoC 200 may maintain active a portion of a streaming pipeline within the DTV SoC 200 for both the current video signal and the selected video signal. Those portions of the DTV SoC 200 that are not maintained active may be disabled or placed in an idle mode or standby mode until needed.

In another embodiment of the invention, the DTV SoC 200 may automatically detect, when processing a current video signal, a predetermined content and/or metadata within the current video signal. The predetermined content and/or metadata may be detected by the audio module 204, the video module 206, and/or the core processor module 208, for example. Upon detection of the predetermined content and/or metadata, such as an advertisement or other like content, the DTV SoC 200 may switch from processing the current video signal to processing another video signal. Similarly, the DTV SoC 200 may switch back to processing the current video signal when a predetermined content and/or metadata is detected within the other video signal. Information regarding the conditions that may trigger a switch upon the detection of certain content may be stored in memory within the DTV SoC 200 (not shown) and/or in the memory module 250. Such information may be dynamically varied to allow different conditions and/or content to enable video source switching. Moreover, the DTV SoC 200 may monitor the content in more than one video signal and may perform switching based on the detection of certain content and/or metadata in any of the video signals being monitored.

Figure 3A:
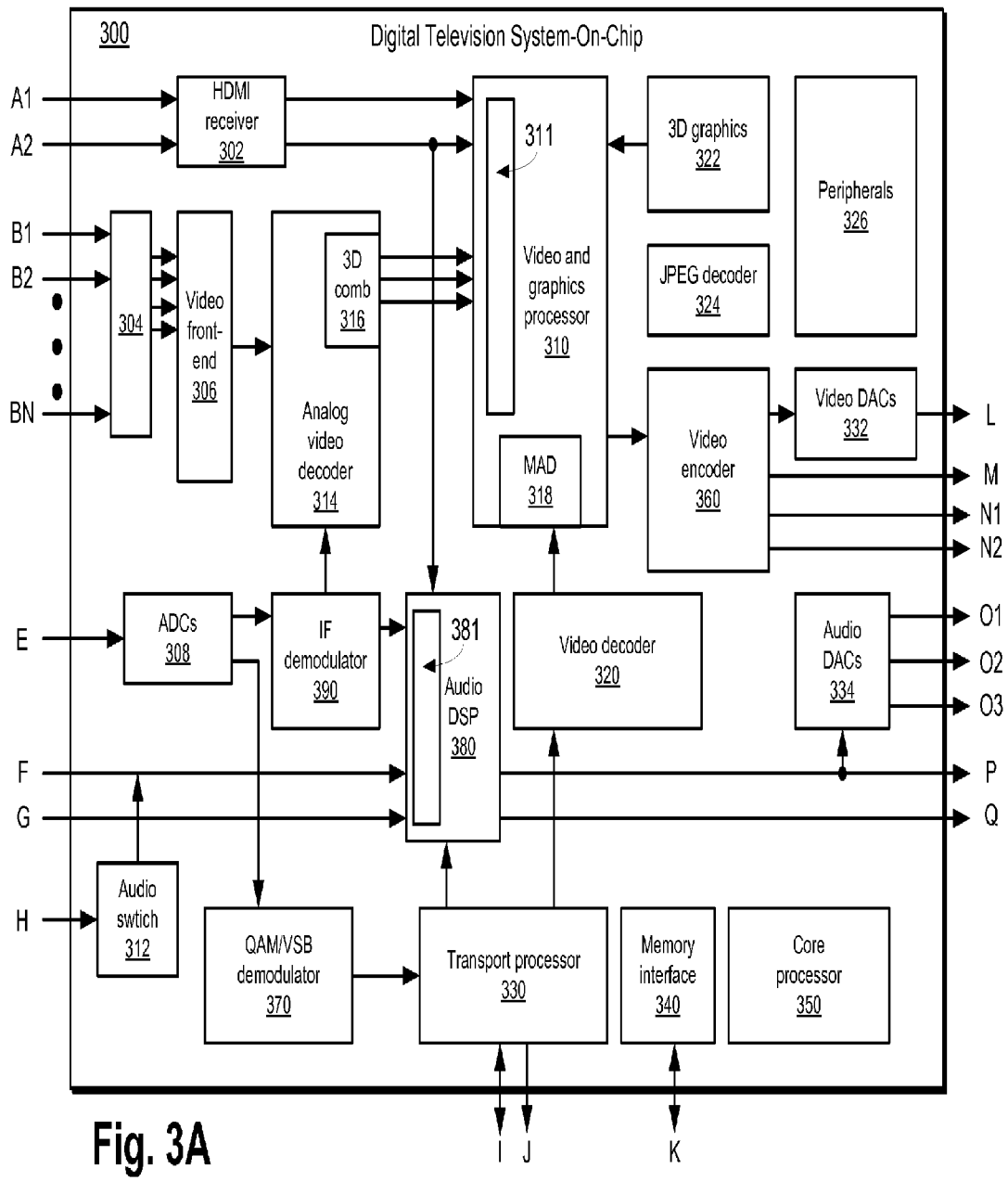
FIGS. 3A and 3B are block diagrams illustrating an exemplary digital television system-on-chip, in accordance with an embodiment of the invention.
Figure 3B:
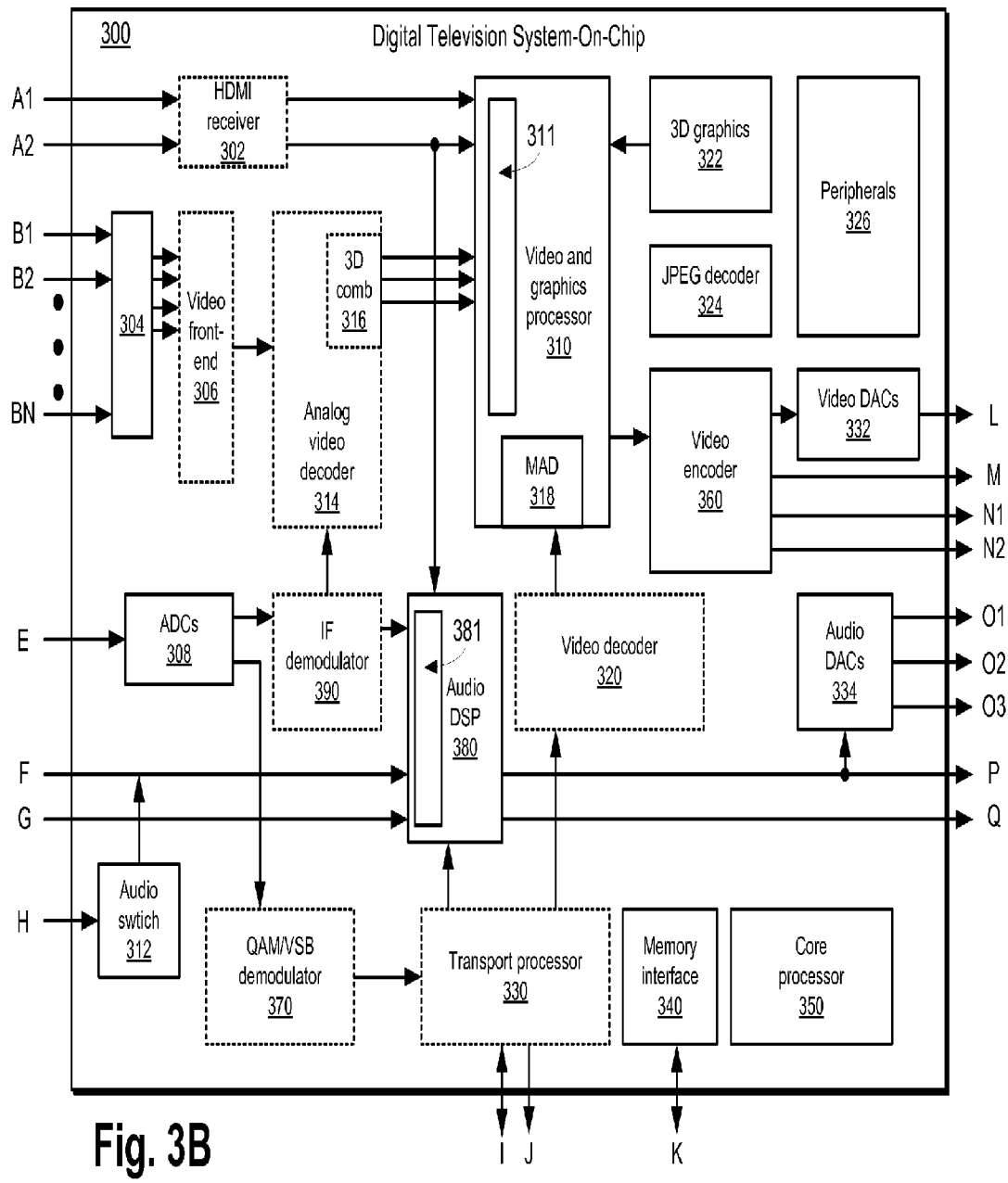

FIGS. 3A and 3B are block diagrams illustrating an exemplary DTV SoC, in accordance with an embodiment of the invention. With respect to FIG. 3A, there is shown a DTV SoC 300 that may be operable to receive and process one or more video signals. In this regard, the DTV SoC 300 may comprise multiple modules that may be operable to process image data and/or audio data comprised in the video signals received. The various modules in the DTV SoC 300 may be hardware modules, software modules, or a combination threreof. The processing of the video signals by the DTV SoC 300 may include fast source switching operations and/or automatic source switching operations, for example. The various modules comprised within the DTV SoC 300 may be configured to provide one or more streaming pipelines within the DTV SoC 300 to process one or more video signals received by the DTV SoC 300.

The DTV SoC 300 may comprise an HDMI receiver module 302, a switch module 304, a video front-end module 306, an analog video decoder module 314, a video and graphics processor module 310, a video encoder module 360, a video decoder module 320, and a video digital-to-analog converters (DACs) module 332. The DTV SoC 300 may comprise a three-dimensional (3D) graphics module 322, a Joint Photographic Experts Group (JPEG) decoder module 324, and a peripherals module 326. The DTV SoC 300 may comprise an analog-to-digital converters (ADCs) module 308, an intermediate-frequency (IF) demodulator module 390, an audio digital signal processor (DSP) module 380, an audio switch module 312, and an audio DACs module 334. The DTV SoC 300 may also comprise a quadrature amplitude modulation/vestigial sideband (QAM/VSB) demodulator module 370, a transport processor module 330, a core processor module 350, and a memory interface module 340.

The HDMI receiver module 302 may comprise suitable logic, circuitry, code, and/or interfaces that may be operable to receive multiple HDMI signals. In an embodiment of the invention, the HDMI receiver module 302 may comprise two complete and independent HDMI receivers (not shown), each capable of handling an HMDI signal input. In this regard, each of the input signals A1 and A2 received by the HDMI receiver module 302 may be an HDMI signal. Each HDMI receiver may be compatible with HDMI, digital video interface (DVI), and high-bandwidth digital content protection (HDCP) specifications, for example. The HDMI receiver module 302 may also be operable to perform functions such as color space conversion and/or pixel decimation, for example. The processed HDMI signals may be communicated to the video and graphics processor module 310 and/or to the audio DSP module 380, for example.

The switch module 304 may comprise suitable logic, circuitry, code, and/or interfaces that may be operable to receive multiple video signals, such as video signals B1, B2, . . . , BN, for example. The video signals received by the switch module 304 may comprise, but need not be limited to, component signals, S-video signals, RGB signals, CVBS or composite signals, and SIF signals. The switch module 304 may be operable to select one or more of the video signals received to be communicated to the video front-end module 306 for processing.

The video front-end module 306 may comprise suitable logic, circuitry, code, and/or interfaces that may be operable to receive signals from the switch module 304, process the received signals, and communicate the processed signals to the analog video decoder module 314. The video front-end module 306 may comprise multiple ADCs (not shown) that may be utilized to digitize the video signals communicated from the switch module 304. The video front-end module 306 may receive an input signal C that may be utilized for synchronizing operations within the video front-end module 306. In this regard, the input signal C may be a clock signal or other like reference signal, for example.

The analog video decoder module 314 may comprise suitable logic, circuitry, code, and/or interfaces that may be operable to process digitized video signals received from the video front-end 306. The analog video decoder module 314 may be operable to process digitized analog video signals such as digitized analog video signals based on various standards such as National Television System Committee (NTSC) standards, phase alternate line (PAL), and sequential color with memory (SECAM). The analog video decoder module 314 may also be operable to process a vertical blanking interval (VBI), typically referred to as vertical interval or VBLANK, or its equivalent, which is typically present in various analog video signals and in other signals such as video graphics array (VGA) signals and/or DVI signals. The vertical blanking interval may refer to a time difference between the last line of one frame or field of a raster display and the beginning of the first line of the next frame or field. The vertical blanking interval may be utilized as synchronization information associated with the corresponding video signal.

The analog video decoder module 314 may include a 3D comb module 316 that comprises suitable logic, circuitry, code, and/or interfaces operable to perform 3D comb filtering operations for analog video signals. Such operations may enable the reduction of various artifacts that may result from the processing of the video signals for transmission, for example. The output of the 3D comb module 316 may be communicated to the video and graphics processor module 310.

The video and graphics processor module 310 may comprise suitable logic, circuitry, code, and/or interfaces that may be operable to perform a wide range of operations on video signals received from the HDMI receiver module 302, the analog video decoder 314, and/or the video decoder 320. The video and graphics processor module 310 may comprise a motion-adaptive de-interlacer (MAD) module 318 that may be operable to perform standard definition (SD) and/or high definition (HD) MAD operations. The MAD module 318 may also support inverse or reverse telecine operations that detect and remove 2-3 pulldown from telecined video signals.

The video and graphics processor module 310 may perform processing operations that may include, but need not be limited to, display control operations, scaling operations, picture enhancement operations, digital noise reduction operations, analog noise reduction operations, letterbox detection operations, video capture and feeding operations, and/or video bypass and routing operations. The display control operations supported by the video and graphics processor module 310 may comprise configuring a network of modules within the video and graphics processor module 310 and/or outside of the video and graphics processor module 310 to support multiple display output formats. In this regard, the data transfer in the configurable network of modules may be controlled utilizing a self-regulating data flow control mechanism.

The scaling operations supported by the video and graphics processor module 310 may comprise two-dimensional scaling, including SD scaling, HD scaling, and/or non-linear horizontal scaling with multiple scaling regions in which the side regions may utilize a higher-order difference equation for the scale factor. The video and graphics processor module 310 may also support video image cropping. The scaling operations may utilize separate luma and chroma coefficients, for example.

The picture enhancement operations supported by the video and graphics processor module 310 may comprise adjustments to the color space, sharpness, and brightness of the video images to improve image quality. Such improvements in image quality may be utilized in connection with various functions that may include, but need not be limited to, auto-flesh, green boost, soft saturate luma, black stretch adjustment, histogram equalization, blue shift, and sharpness improvement. The picture enhancement operations may also enable 3D color management adjustments over various regions of a video image based on luma-chroma or hue-saturation coordinates, for example. Within each of these regions, both luma and chroma adjustments may be possible.

The digital noise reduction (DNR) operations supported by the video and graphics processor module 310 may comprise adaptive block noise reduction and adaptive mosquito noise reduction. In some embodiments of the invention, the digital noise reduction operations may be applied before scaling or de-interlacing operations. The digital noise reduction operations may be applied to video image data in various formats, such as MPEG or Advanced Video Coding (AVC) formats, for example, and in various resolutions, including SD and HD, for example.

The analog noise reduction (ANR) operations supported by the video and graphics processor module 310 may comprise reduction of random noise that may be result from the external video source. For example, the analog noise reduction operations may include, but need not be limited to, motion detection, edge detection, and adaptive temporal filter that are utilized to reduce random noise.

The letterbox detection operation supported by the video and graphics processor module 310 may comprise aspect ratio detection, black line detection, black column detection. In this regard, the letterbox detection operation may support letterbox format detection, pillarbox format detection, and postage-stamp format detection. When a video image has an ambiguous format, whether because the video image is mostly black or has excessive noise, the letterbox detection operation may consider or treat such a video image as being letterbox formatted. The letterbox detection operation need not change the formatting of the video images automatically, but may do so based on different usage models and/or user input.

The video capture operations supported by the video and graphics processor module 310 may comprise receiving video image data from one or more modules within the video and graphics processor module 310, formatting the video image data (e.g., down-sampling, rounding/truncation), and sending the video image data to memory, such as a Dynamic Random Access Memory (DRAM) external to the video and graphics processor module 310. The video feeding operations supported by the video and graphics processor module 310 may comprise receiving video image data from memory external to the video and graphics processor module 310, formatting the video image data (e.g., up-sampling), and sending the video image data to one or more modules within the video and graphics processor module 310 for processing.

The video bypass and routing operations supported by the video and graphics processor module 310 may comprise bypassing modules within the video and graphics processor module 310 and sending the video image data to the video encoder 360. The video bypass and routing operations may comprise configuring the routing of data within the video and graphics processor module 310 in a manner that certain operations, such as scaling operations, for example, may be bypassed. The video bypass and routing operations may also comprise configuring the routing of data within the video and graphics processor module 310 such that the output of DNR operations may be routed back to scaling or MAD operations, the output of MAD operations may be routed back to scaling operations, and/or the output of ANR operations may be routed back to scaling operations, for example.

The video and graphics processor module 310 may comprise a switch module 311 that may be utilized for selecting one or more signals during the fast source switching operations and/or the automatic source switching operations supported by the DTV SoC 300. The switch module 311 may have multiple input ports and multiple output ports that allow for the selection of more than one signal. In one embodiment of the invention, the switch module 311 may comprise an N×1 switching fabric to enable signal selection. In another embodiment of the invention, the switch module 311 may comprise an N×M fabric, where M≥2, to enable signal selection. The one or more signals selected by the switch module 311 may be processed by one or more modules in the DTV SoC 300 that handle video processing and are downstream from the switch module 311, including the video and graphics processor 310, for example. In this regard, those modules in the DTV SoC 300 that may support the processing of the signals selected by the switch module 311 may be maintained active to enable fast source switching and/or the automatic source switching for those signals that may be locked-in within the DTV SoC 300.

The 3D graphics module 322 may comprise suitable logic, circuitry, code, and/or interfaces that may be operable to provide 3D graphics acceleration for video image processing. The JPEG decoder module 324 may comprise suitable logic, circuitry, code, and/or interfaces that may be operable to provide JPEG decoding for certain video applications such as motion JPEG, for example.

The peripherals module 326 may comprise suitable logic, circuitry, code, and/or interfaces that may be operable to configure, control, and/or coordinate the reception and/or sending of data to one or more peripheral modules and/or devices communicatively coupled to the DTV SoC 300. In this regard, the peripherals module 326 may support communication with a keypad and/or a display. The peripherals module 326 may also support communication with a network, such as an Ethernet network. The peripherals module 326 may also support communication via one or more of a general purpose input/output (GPIO) port or interface, a universal asynchronous receiver/transmitter (UART), and/or a universal serial bus (USB), for example.

The video encoder 360 may comprise suitable logic, circuitry, code, and/or interfaces that may be operable to receive an output from the video and graphics processor module 310. The video encoder 360 may generate multiple digital signals, including but not limited to, digital signals to be provided to the video DACs module 332 for conversion to analog form, an output signal M associated with the ITU-656 digital video protocol for streaming uncompressed PAL or NTSC SD signals, and/or a pair of low-voltage differential signals (LVDS) outputs N1 and N2 comprising digital video data. The digital signals provided to the video DACs module 332 from the video encoder 360 may be associated with S-video signals, CVBS signals, and/or component signals received and processed by the DTV SoC 300. The video DACs module 332 may generate one or more analog output signals L from the digital signals received from the video encoder 360.

The video encoder 360 may be operable to handle two video streams and their associated VBI streams, for example. In some embodiments of the invention, when the output of the video encoder 360 is an analog output, the VBI data may be inserted in the outgoing analog waveform.

The transport processor module 330 may comprise suitable logic, circuitry, code, and/or interfaces that may be operable to provide parsing and/or multiplexing operations for MPEG transport stream messages and/or packetized elementary streams (PESs). The transport processor module 330 may be operable to process multiple packet identifiers (PIDs) and/or multiple PID channels. The transport processor module 330 may utilize a channel, which may be referred to as a playback channel, to read from memory data associated with one or more streams. The transport processor module 330 may also utilize a channel, which may be referred to as a recording channel, to send to memory data associated with one or more streams. The transport processor module 330 may utilize input/output signals or bus I to receive data from memory and/or to send data to memory. In this regard, the transport processor module 330 may also utilize an output signal J, which may be based on, for example, the Firewire IEEE 1394 standard. The transport processor module 330 may provide audio data to the audio DSP module 380 and/or video image data to the video decoder module 320, for example.

The video decoder module 320 may comprise suitable logic, circuitry, code, and/or interfaces that may be operable to receive one or more streams of video image data from memory via the transport processor module 330. The video decoder module 320 may be operable to decode the video image data and write the decoded video image data back to memory. The video decoder module 320 may be operable to decode more than one encoded stream of video image data. The video decoder module 320 may be operable to perform a front-end processing portion and a back-end processing portion. The front-end processing portion may comprise conversion of the code stream into exemplary fundamental components comprising motion vectors, and transform coefficients. The back-end processing portion may comprise generation and/or manipulation of pixels, for example.

The video decoder module 320 may be operable to decode and/or process exemplary data streams such as H.264/AVC, VC-1, MPEG-2, MPEG still picture, MPEG-4, and DivX, for example. Moreover, the video decoder module 320 may also support error concealment operations and/or concurrent processing of multiple low-resolution streams, for example.

The IF demodulator module 390 may comprise suitable logic, circuitry, code, and/or interfaces that may be operable to receive and process a digitized signal from the ADCs module 308. In this regard, the ADCs module 308 may receive an input signal E associated with NTSC IF television, for example. The IF demodulator module 390 may generate CVBS output signals that may be communicated to the analog video decoder 314 and an audio signal, such as a Broadcast Television Systems Committee (BTSC) audio signal, for example, which may be communicated to the audio DSP module 380.

The QAM/VSB demodulator module 370 may comprise suitable logic, circuitry, code, and/or interfaces that may be operable to receive a digitized analog signal in one of multiple QAM formats from the ADCs module 308, where the digitized analog signal is centered at a standard television IF. The QAM/VSB demodulator module 370 may amplify the received signal, demodulate, match filter, and/or adaptively filter the received signal to remove multipath propagation effects and/or narrowband co-channel interference. The QAM/VSB demodulator module 370 may utilize integrated trellis and Reed-Solomon decoders, for example. The data stream processed by the QAM/VSB demodulator module 370 may be provided to the transport processor module 330 in, for example, MPEG transport format.

The QAM/VSB demodulator module 370 may also support the processing of ATSC A/53 Digital Television Standard, which is a standard for the terrestrial transmission of SD and HD television signals. The ATSC A/53 Digital Television Standard is based on an 8-level vestigial sideband (8-VSB) trellis-coded modulation format. A high data-rate mode for use in a cable television environment that utilizes 16-VSB is also specified by the ATSC A/53 Digital Television Standard.

The audio DSP module 380 may comprise suitable logic, circuitry, code, and/or interfaces that may be operable to process audio data received by the DTV SoC 300. In this regard, the audio DSP module 380 may be operable to decompress audio associated with MPEG, Dolby Digital, MPEG-2 advanced audio coding (AAC), MPEG-4 AAC, and Dolby Digital Plus, for example. The audio DSP module 380 may also support a second digital audio path that allows simultaneous output of a digital audio service in compressed form on Sony/Philips Digital Interconnect Format (S/PDIF).

The audio DSP module 380 may process audio data in multiple formats and/or from multiple sources such as, but not limited to, an S/PDIF input (e.g., input signal G), an inter-IC sound ($I^2S$) signal (e.g., input signal F), pulse code modulation (PCM) HDMI, PCM SPDIF, and/or BTSC audio. Multiple left and right audio channels (e.g., input signals H) may be received by the audio DSP module 380 through the audio switch module 312, which may be utilized to digitize analog audio signals. The processed audio data may be output through an S/PDIF output (e.g., output signal P), an $I^2S$ output (e.g., output signal Q), and/or the audio DACs module 334 (e.g., output signals O1, O2, O3).

The audio DSP 380 may comprise a switch module 381 that may be utilized for selecting one or more signals during the fast source switching operations and/or the automatic source switching operations supported by the DTV SoC 300. The switch module 381 may have multiple input ports and multiple output ports that allow for the selection of more than one signal. In one embodiment of the invention, the switch module 381 may comprise an N×1 switching fabric to enable signal selection. In another embodiment of the invention, the switch module 381 may comprise an N×M fabric, where M≥2, to enable signal selection. The one or more signals selected by the switch module 381 may be processed by one or more modules in the DTV SoC 300 that handle audio processing and are downstream from the switch module 381, including the audio DSP module 380, for example. In this regard, those modules in the DTV SoC 300 that may support the processing of the signals selected by the switch module 381 may be maintained active to enable fast source switching and/or automatic source switching for those signals that may be locked-in within the DTV SoC 300.

The memory interface module 340 may comprise suitable logic, circuitry, code, and/or interfaces that may be operable to receive data from memory and/or send data to memory via an input/output signal or bus K. The external memory may be double data rate (DDR2) synchronous dynamic random access memory (SDRAM), for example. In this regard, the memory interface module 340 may operate as a DDR2 SDRAM controller, for example. The memory interface module 340 may also comprise interfaces and/or control for other types of memory (e.g., FLASH memory) that may be external to the DTV SoC 300.

The core processor module 350 may comprise suitable logic, circuitry, code, and/or interfaces that may be operable to control and/or configure operations of the DTV SoC 300. The core processor module 350 may be based on, for example, a reduced instruction set computer (RISC) architecture. In some embodiments of the invention, the core processor module 350 may comprise dual processing cores, for example.

Referring to FIG. 3B there is shown an example of a front-end portion and a back-end portion of the DTV SoC 300 of FIG. 3A. In this example, certain modules that are upstream from the switch module 311 in the video and graphics processor 310 and from the switch module 381 in the audio DSP 380 are shown with a dashed-line outline. Those modules may be part of a front-end portion of the DTV SoC 300 in which the DTV SoC 300 may lock to video signals comprising image data and/or audio data. That is, one or more of the modules shown to be part of the front-end portion of the DTV SoC 300 may be utilized to lock to a carrier signal or other like reference signal or information and/or to lock to an input signal by having a decoder programmed to decode the input signal.

The modules in FIG. 3B that are shown with a solid outline may be part of a back-end portion of the DTV SoC 300 that may process the image data and/or the audio data of those signals selected by the switch modules 311 and 381. In this regard, a portion of the back-end portion of the DTV SoC 300 may be maintained active to enable fast source switching and/or automatic source switching operations. For example, those portions of the back-end portion of the DTV SoC 300 that may support the processing of signals that are locked-in within the front-end portion of the DTV SoC 300 may be maintained active while other portions of the back-end portion of the DTV SoC 300 may be placed in an idle mode or standby mode, for example.

In operation, the DTV SoC 300 may receive multiple video signals from one or more sources such as radio frequency broadcasts, cable television services, satellite television services, IPTV services, and/or DVR or PVR playback, for example. One or more modules in the DTV SoC 300 may be utilized to lock to the video signals received by the DTV SoC 300. One or more of the video signals that are locked-in within the DTV SoC 300 may be selected and the DTV SoC 300 may switch from processing one or more current video signals to processing the selected video signals. The switch may occur in, for example, one or both of the switch modules 311 and 381. In carrying out such a switch, the DTV SoC 300 may maintain active a back-end portion of the DTV SoC 300 that supports processing for video signals that are currently being processed and video signals that have been selected to be processed next.

In an embodiment of the invention, the DTV SoC 300 may automatically detect, when processing a current video signal, a predetermined content and/or metadata within the current video signal. The predetermined content and/or metadata may be detected by the core processor module 350 and/or by one or more modules in the DTV SoC 300 associated with the processing of the current video signal, for example. Upon detection of the predetermined content and/or metadata, such as an advertisement or other like content, for example, the DTV SoC 300 may switch from processing the current video signal to processing a selected video signal. Similarly, the DTV SoC 300 may switch back to processing the current video signal when a predetermined content and/or metadata is detected within the selected video signal by the core processor module 350 and/or by one or more modules in the DTV SoC 300 associated with the processing of the selected video signal, for example.

Figure 4A:
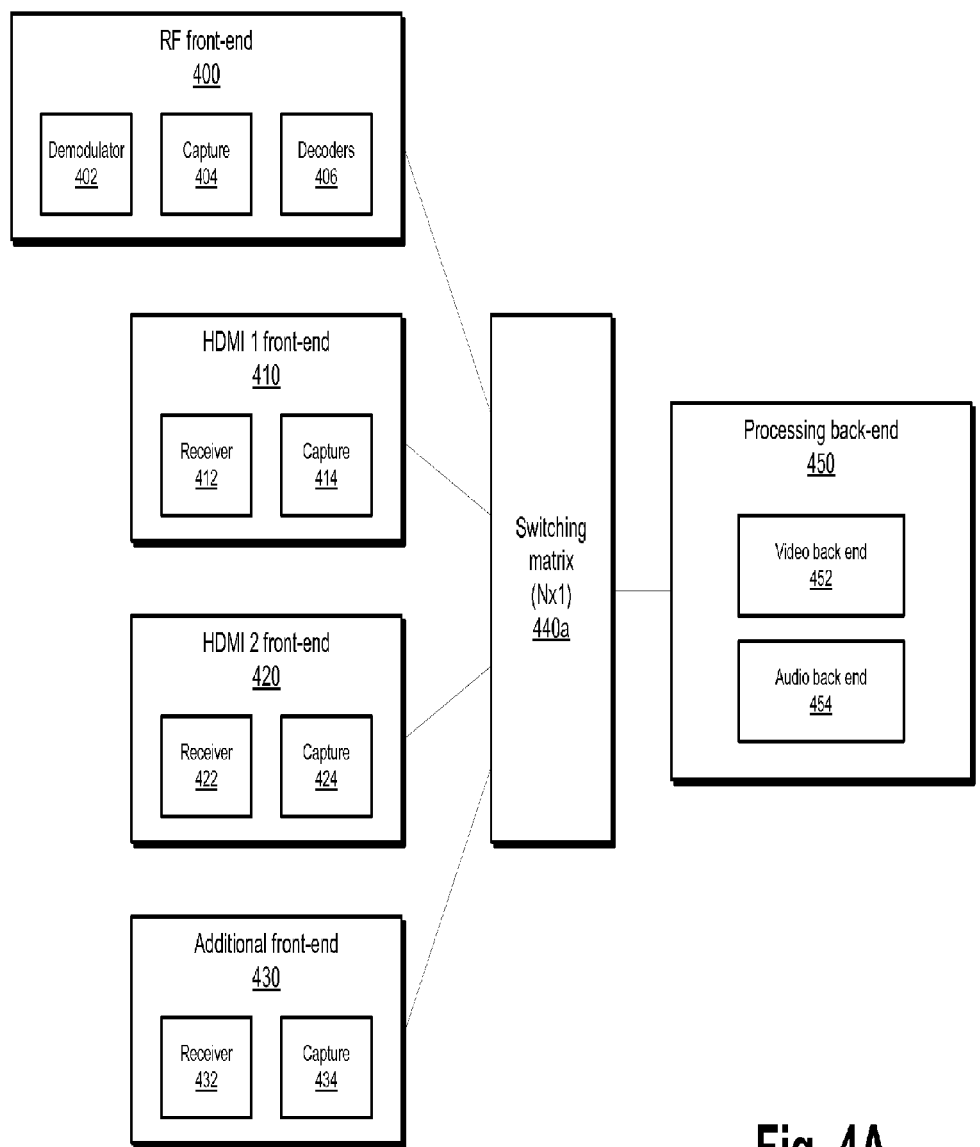
FIGS. 4A and 4B are block diagrams illustrating multiple front ends in a processor for fast source switching and/or automatic source switching, in accordance with embodiments of the invention.
Figure 4B:
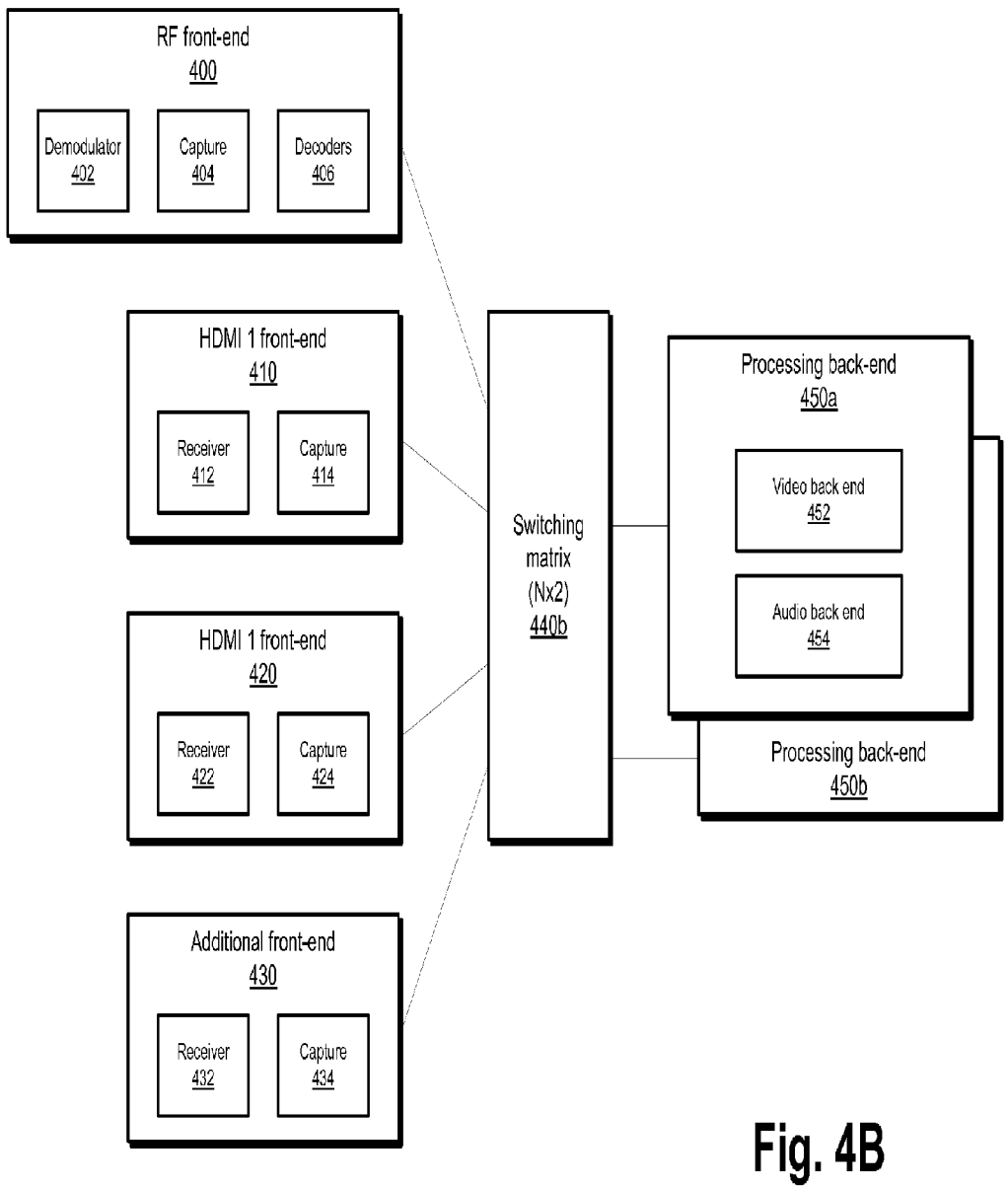

FIGS. 4A and 4B are block diagrams illustrating multiple front-end modules in a processor for fast source switching and/or automatic source switching, in accordance with embodiments of the invention. Referring to FIG. 4A, there are shown multiple front-end modules that may be implemented within a processor, such as the DTV SoC 200 described above with respect to FIG. 2 or the DTV SoC 300 described above with respect to FIGS. 3A and 3B, for example. In this embodiment of the invention, an RF front-end module 400, an HDMI 1 front-end module 410, an HDMI 2 front-end module 420, and an additional front-end module 430 may be implemented within a processor. The various front-end modules are shown to be communicatively coupled to a switching matrix module 440, which in turn is communicatively coupled to a processing back-end module 450. In other embodiments of the invention, more or fewer front-end modules may be utilized. The front-end modules shown in FIG. 4A may correspond to one or more, and/or to a portion of one or more, of the modules in the DTV SoC 200 or in the DTV Soc 300, for example.

Each of the front-end modules may be associated with a particular video signal received by the processor. Moreover, each of the front-end modules may comprise suitable logic, circuitry, and/or code that may enable the front-end module to lock to its corresponding video signal. In this regard, the front-end module may be operable to lock to a carrier signal or to other like signal or information within the video signal and/or may be operable to lock to the video signal by obtaining information from a portion of the video signal to program a decoder to decode a remaining portion of the video signal. For example, the RF front-end module 400 may comprise a demodulator module 402, a capture module 404, and a decoder module 406 that may be utilized in connection with processing and locking to the video signal associated with the RF front-end module 400. The HDMI 1 front-end module 410 may comprise a receiver module 412 and a capture module 414 that may enable processing and locking to the video signal associated with the HDMI 1 front-end module 410. The HDMI 2 front-end module 420 may comprise a receiver module 422 and a capture module 424 that may enable processing and locking to the video signal associated with the HDMI 2 front-end module 420. Moreover, the additional front-end module 430 may comprise a receiver module 432 and a capture module 434 that may enable processing and locking to the video signal associated with the additional front-end module 430.

The switching matrix module 440a may comprise suitable logic, circuitry, code, and/or interfaces that may be operable to enable the selection of one of the video signals processed by the front-end modules and communication of such selected video signal to the processing back-end module 450. In this regard, the switching matrix module 440a may comprise an N×1 switching fabric to enable the selection. The switching matrix module 440a may be dynamically configured to select any one of the video signals provided by the front-end modules based on the operation of the processor.

The processing back-end module 450 may comprise suitable logic, circuitry, code, and/or interfaces that may be operable to process the video signal selected by the switching matrix module 440a. In this regard, the processing back-end module 450 may correspond to those portions of the processor that are to be maintained active to enable fast source switching and/or automatic source switching. In this regard, a video back-end module 452 and an audio back-end module 454 in the processing back-end module 450 may correspond to those portions of the processor that are downstream from the switching matrix module 440a and that may be maintained active to enable the video and/or audio processing pipelines necessary to process a video signal selected by the switching matrix module 440a from any one of the locked-in front-end modules.

Referring to FIG. 4B, a switching matrix module 440b and processing back-end modules 450a and 450b may be utilized instead to enable the video signals from two different front-end modules to be selected for processing. In this regard, the switching matrix module 440b may be an N×2 switching fabric and the processing back-end modules 450a and 450b may each be substantially similar to the processing back-end module 450 described above with respect to FIG. 4A. Moreover, since two different video signals may be selected, up to two video signals may be switched concurrently by utilizing the switching matrix module 440b.

Figure 5:
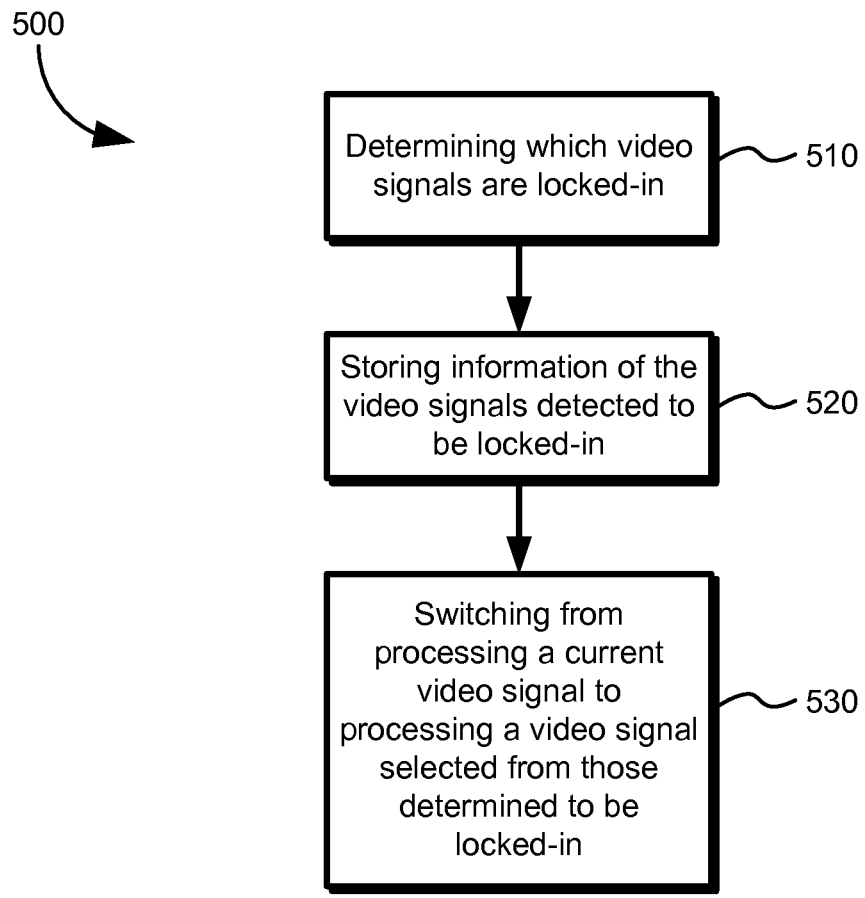
FIG. 5 is a flow chart that illustrates an exemplary fast source switching operation, in accordance with an embodiment of the invention.

FIG. 5 is a flow chart that illustrates exemplary fast source switching, in accordance with embodiments of the invention. Referring to FIG. 5, there is shown a flow chart 500 in which, at step 510, it may be determined which of the video signals received by a processing device are locked-in within the processing device. The processing device may be, for example, the DTV SoC 200 or the DTV SoC 300 described above. Locking to the video signal may occur in a front-end portion of the processing device. In an embodiment of the invention, the processing device may be operable for use within a display device such as the display unit 100 described above with respect to FIG. 1. In other embodiments of the invention, the processing device may be operable for use within a different device, such as the set-top-box 110, the DVR 120, and the network interface device 130 also described above with respect to FIG. 1.

At step 520, the information associated with which of the video signals are locked-in within the processing device may be stored in memory, where the memory may be internal to the processing device and/or external to the processing device, such as the memory module 250 described above with respect to FIG. 2, for example. At step 540, the processing device may switch from processing a current video signal to processing a video signal that is selected from those determined to be locked-in within the processing device. The processing may occur in a back-end portion of the processing device, which may include those portions of the processing device that are maintained active for both the current video signal and the selected video signal. The fast source switching described in connection with FIG. 5 may be utilized, for example, to reduce the time it takes to switch between source signals in a television or other like device.

Figure 6:
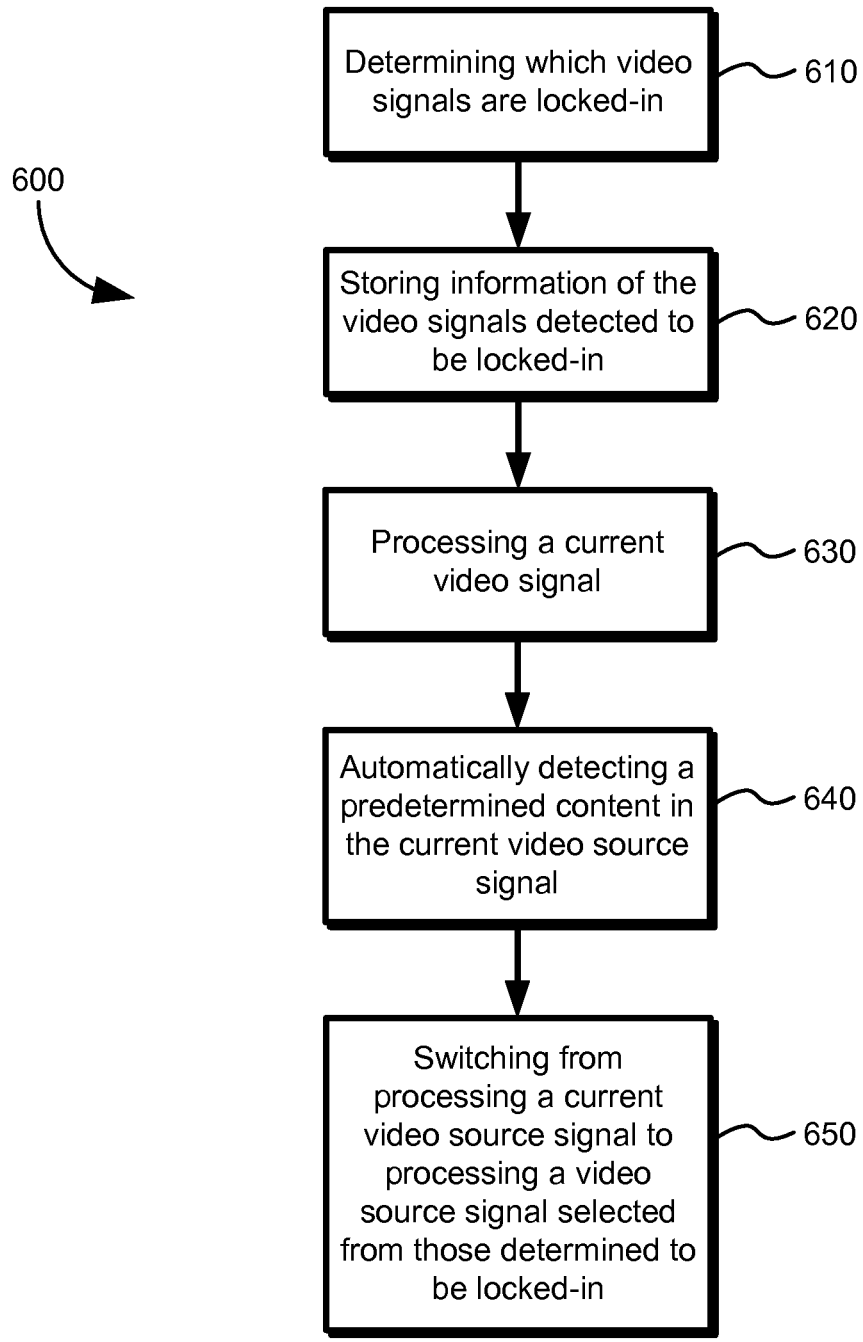
FIG. 6 is a flow chart that illustrates an exemplary automatic source switching operation, in accordance with an embodiment of the invention.

FIG. 6 is a flow chart that illustrates an exemplary automatic source switching operation, in accordance with an embodiment of the invention. Referring to FIG. 6, there is shown a flow chart 600 in which steps 610 and 620 are substantially similar to steps 510 and 520 described above with respect to FIG. 5. At step 630, the processing device may be processing a current video signal in a back-end portion of the processing device that is maintained active for the current video signal and for a subsequent video signal from those known to be locked-in to the processing device. At step 640, the processing device may automatically detect a predetermined content and/or metadata within the current video signal being processed. Such detection may include detecting a gap in the signal that may be typically associated with the start of an advertisement and/or detecting metadata content in, for example, certain portions (e.g., headers) of the current video signal. At step 650, after the predetermined content and/or metadata is detected, the processing device may switch from processing the current video signal to processing a video signal that is selected from those determined to be locked-in within a front-end portion of the processing device. In this regard, the detection of the predetermined content and/or metadata may trigger or activate the video signal switch. In some embodiments of the invention, the predetermined content and/or metadata that is to be detected to trigger a switch in video signal processing may be dynamically changed based on, for example, user input.

Figure 7A:
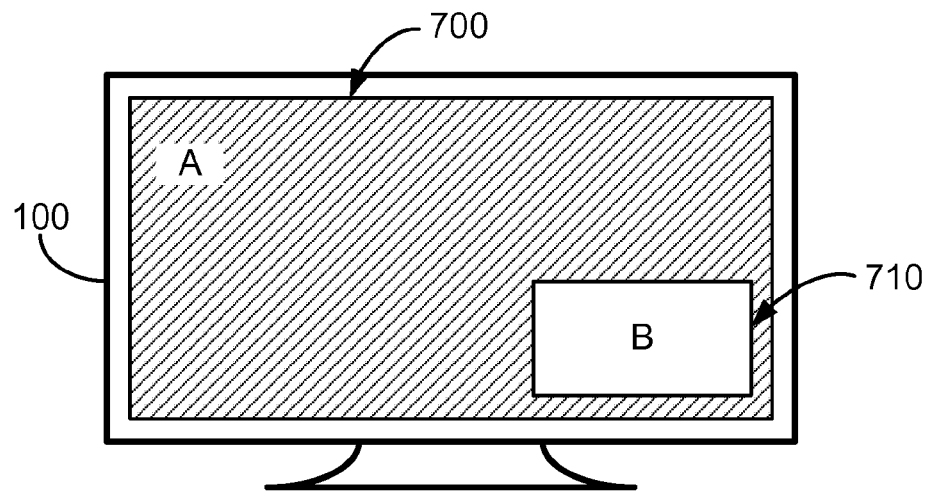
FIGS. 7A and 7B are diagrams that illustrate picture-in-picture source switching, in accordance with an embodiment of the invention.
Figure 7B:
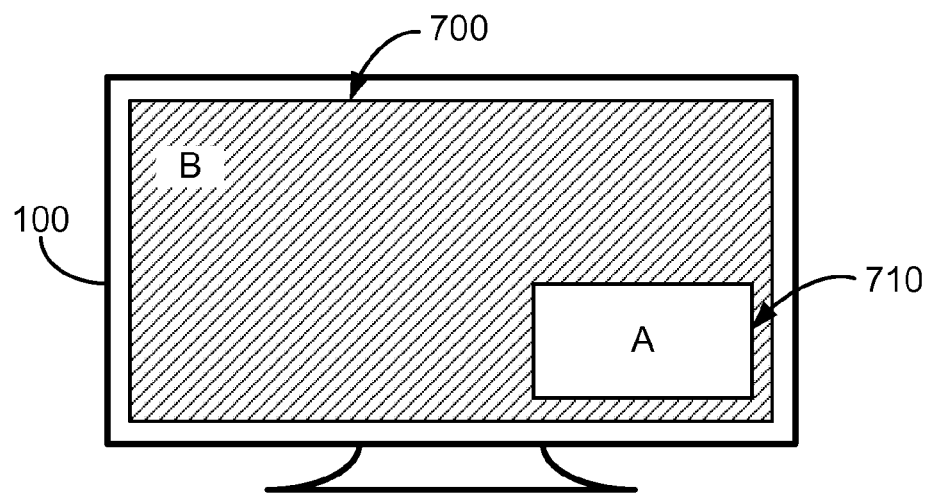

FIGS. 7A and 7B are diagrams that illustrate picture-in-picture source switching, in accordance with an embodiment of the invention. Referring to FIG. 7A, there is shown the display unit 100 described above with respect to FIG. 1 being utilized for a picture-in-picture (PiP) format. A PiP format is a feature that may be provided in television receivers in which one program is displayed over the entire television screen and one or multiple other programs are displayed in inset windows. While more than one program may be displayed concurrently using the PiP format, typically only the audio content of the program being displayed over the entire television screen is reproduced. Each program being displayed it typically associated with a different video signal provided to the television receiver.

Referring FIG. 7A, a picture 700, which is illustrated by a hatch pattern, comprises a substantial portion of the screen or display area of the display unit 100. The picture 700 may be associated with a video signal A as indicated in the upper-left corner of the picture. That is, the images of the video signal A are displayed on the picture 700. An inset picture 710, which is illustrated in solid white, comprises a portion of the lower-left corner of the display area of the display unit 100. The location of the inset picture 700 is merely for illustration purposes and the inset picture 710 may be placed in any one of multiple locations on the display area. The inset picture 710 may be associated with a video signal B as indicated in the middle of the picture. That is, the images of the video signal B are displayed on the inset picture 700. Moreover, even though a single inset picture 710 is shown in FIG. 7A, the invention need not be so limited and multiple inset pictures may be utilized concurrently, each of which may be associated with a different video signal.

As described above, a fast source switching operation and/or an automatic source switching operation may be utilized to switch between video signals displayed by the display unit 100. In this regard, a fast source switching operation and/or automatic source switching operation may also be utilized in connection with the use of the PiP format in the display unit 100.

Referring to FIG. 7B, the video signals associated with the picture 700 and with the inset picture 710 may be switched utilizing the fast source switching described above. In this regard, since a PiP format may support having two video signals processed and/or switched concurrently, the embodiment described above with respect to FIG. 4B may be utilized for fast source switching and/or for automatic source switching since two processing back-end modules are available. Accordingly, the video signal A, which is initially associated with the picture 700 as shown in FIG. 7A, may be switched to be displayed in connection with the inset picture 710. Similarly, the video signal B, which is initially associated with the inset picture 710, may be switched to be displayed in connection with the picture 700. By utilizing fast source switching to reduce the switching time, the swapping of the video signals A and B between the picture 700 and the inset picture 710 in the PiP format may be more visually pleasing to a viewer. Moreover, the swapping of the video signals A and B between the picture 700 and the inset picture 710 in the PiP format may be triggered or activated by a predetermined content and/or metadata detected in either or both of the video signals A and B. For example, when an advertisement is detected in the video signal associated with the picture 700, the fast source switching may be triggered such that the video signal associated with the inset picture 710 may be displayed in the picture 700.

Figure 7C:
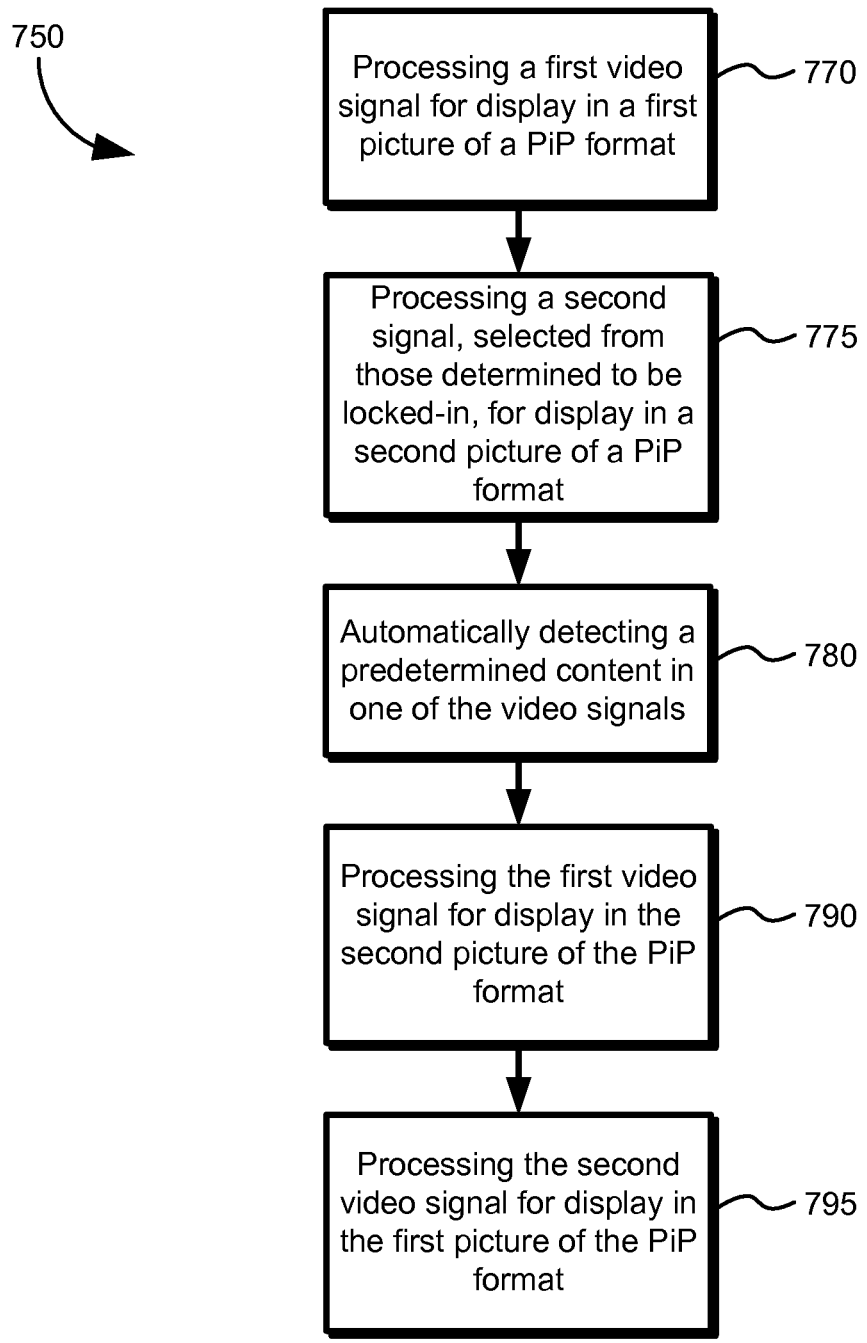
FIG. 7C is a flow chart that illustrates an exemplary automatic picture-in-picture source switching operation, in accordance with an embodiment of the invention.

FIG. 7C is a flow chart that illustrates an exemplary automatic picture-in-picture source switching operation, in accordance with an embodiment of the invention. Referring to FIG. 7C, there is show a flow chart 750 in which, at step 770, the processing device may process a first video signal for display in a first picture of a PiP format. For example, the processing device may process a first video signal for display in the picture 700 described above with respect to FIGS. 7A and 7B. Such processing may be performed by, for example, the processing back-end module 540a shown in FIG. 4B. At step 775, the processing device may process a second video signal for display in a second picture of the PiP format. For example, the processing device may process a second video signal for display in the inset picture 710 described above with respect to FIGS. 7A and 7B. Such processing may be performed by, for example, the processing back-end module 540b shown in FIG. 4B.

At step 780, the processing device may detect a predetermined content and/or metadata in one of the video signals. Such detection may trigger or activate a swap or switch between the first video signal which is being displayed in the first picture of the PiP format and the second video signal which is being displayed in the second picture of the PiP format. Such switching may be performed by, for example, the switching matrix module 440b shown in FIG. 4B, which has an N×2 switching configuration.

At step 790, after the predetermined content and/or metadata is detected in one of the video signals, the processing device may switch to process the first video signal for display in the second picture of the PiP format. That is, the first video signal may now be processed by the processing back-end module 540b. At step 795, after the predetermined content and/or metadata is detected in the one of the video signals, the processing device may switch to process the second video signal for display in the first picture of the PiP format. That is, the second video signal may now be processed by the processing back-end module 540a. The switching that occurs in connection with steps 790 and 795 may be based on the fast source switching operation described above, which may make the automatic swapping of video signals in a PiP format, as described in FIGS. 7A-7C, more visually pleasing to a viewer.

In an embodiment of the invention, each of the DTV SoC 200 and the DTV SoC 300 may be implemented as a single integrated circuit. Moreover, each of the DTV SoC 200 and the DTV SoC 300 may be implemented on a single substrate, such as a complimentary metal-oxide-semiconductor (CMOS) substrate, for example.

Certain embodiments of the invention may relate to a processor comprising a front-end portion and a back-end portion. The processor may be one of the DTV SoC 200 and the DTV SoC 300 described above, for example. The front-end portion and the back-end portion of the processor may correspond to those portions described above with respect to FIGS. 3B, 4A, and 4B, for example. The processor may be operable to determine which of the video signals received is locked-in within the front-end portion of the processor, wherein each of the video signals may comprise one or both of audio data and image data. The processor may be operable to select one of the received video signals determined to be locked-in within the front-end portion of the processor. The processor may then switch from processing a current video signal of the received video signals in the back-end portion of the processor to processing the selected video signal in the back-end portion of the processor.

The processor may be operable to maintain active at least a portion of the back-end portion of the processor that is operable to handle content from each of the received plurality of video signals determined to be locked-in within the front-end portion of the processor. The processor may be operable to lock to a video signal of the received video signals within the front-end portion of the processor when a demodulator in the front-end portion of the processor locks to a carrier in the video signal. The processor may be operable to lock to a video signal of the received video signals within the front-end portion of the processor when a decoder is programmed to decode the video signal. A video signal may comprise one of a CVBS signal, an S-video signal, an HDMI signal, a component signal, a PC signal, an SIF signal, and an RGB signal.

The processor may be operable to automatically detect, when processing the current video signal, a predetermined content within the current video signal. Upon detection of the predetermined content within the current video signal, the processor may be operable to switch from processing the current video signal in the back-end portion of the processor to processing the selected video signal in the back-end portion of the processor. The current video signal may be associated with a first video for display in a picture-in-picture format, while the selected video signal may be associated with a second video for display in the picture-in-picture format. The processor may be operable to automatically detect, when processing the selected video signal, a predetermined content within the selected video signal. Upon detection of the predetermined content within the selected video signal, the processor may be operable to switch back to processing the current video signal in the back-end portion.

The front-end portion of the processor may comprise a first portion and a second portion that is separate from the first portion. The first portion may be operable to lock to the current video signal and the second portion may be operable to lock to the selected video signal. The first portion of the front-end portion of the processor may be an HDMI front-end, such as the HDMI front-end modules 410 and 420 in FIGS. 4A and 4B. Moreover, the second portion of the front-end portion of the processor may be an RF front-end, such as the RF front-end module 400 in FIGS. 4A and 4B.

In another embodiment of the invention, a non-transitory machine and/or computer readable storage and/or medium may be provided, having stored thereon a machine code and/or a computer program having at least one code section executable by a machine and/or a computer, thereby causing the machine and/or computer to perform the steps as described herein for providing fast source switching and/or automatic source switching.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A device, comprising:
an acquisition module that is configured to acquire a first video signal and a second video signal;
a video processing module that is configured to maintain active at least a portion of a first video processing pipeline for processing the first video signal for output to a display device, a remaining portion of the first video processing pipeline being switched off or placed in an idle mode, and to maintain active at least a portion of a second video processing pipeline for processing the second video signal for output to the display device, a remaining portion of the second video processing pipeline being switched off or placed in the idle mode; and
a switch module that is configured to switch between providing the first video signal to the first video processing pipeline for output to the display device without passing any video signal through the maintained active at least the portion of the second video processing pipeline, and providing the second video signal to the second video processing pipeline, including an activated remaining portion of the second video processing pipeline, for output to the display device.

2. The device of claim 1, wherein the switch module is configured to provide the first video signal to the first video processing pipeline exclusively when the first video signal is output to the display device and to provide the second video signal to the second video processing pipeline exclusively when the second video signal is output to the display device.

3. The device of claim 1, wherein the acquisition module is configured to acquire the first video signal from a first signal source and to acquire the second video signal from a second signal source that is different from the first signal source.

4. The device of claim 1, wherein the acquisition module is configured to acquire the first video signal and the second video signal by locking-in the first video signal and the second video signal.

5. The device of claim 1, wherein the first video signal comprises a first program of a signal source and the second video signal comprises a second video program of the signal source.

6. The device of claim 1, wherein the video processing module is further configured to:
detect content in the first video signal while the first video signal is being provided to the the first video processing pipeline; and
trigger the switch module to switch to providing the second video signal to the second video processing pipeline for output to the display device, and maintaining active the at least the portion of the first video processing pipeline, the remaining portion of the first video processing pipeline being switched off or placed in the idle mode, in response to detecting the content.

7. The device of claim 6, wherein the content comprises an advertisement.

8. The device of claim 1, wherein the at least the portion of the first video processing pipeline performs at least one of a display control operation, a scaling operation, a picture enhancement operation, a digital noise reduction operation, or an analog noise reduction operation.

9. A method, comprising
acquiring a first video signal and a second video signal;
activating at least a portion of a first video processing pipeline for processing the first video signal, a remaining portion of the first video processing pipeline being off or in an idle mode, and activating at least a portion of a second video processing pipeline for processing the second video signal, a remaining portion of the second video processing pipeline being off or in the idle mode;
providing the first video signal for display by passing the first video signal through the activated at least the portion of the first video processing pipeline and an activated remaining portion of the first video processing pipeline, while maintaining the at least the portion of the second video processing pipeline activated without passing the second video signal through the at least the portion of the second video processing pipeline, the remaining portion of the second video processing pipeline being off or in the idle mode; and
switching to providing the second video signal for display by passing the second video signal through the maintained activated at least the portion of the second video streaming pipeline and an activated remaining portion of the second video processing pipeline, and maintaining the at least the portion of the first video processing pipeline activated without passing the first video signal through the at least the portion of the first video processing pipeline, the remaining portion of the first video processing pipeline being switched off or placed in the idle mode.

10. The method of claim 9, wherein the first video signal is passed to the activated at least the portion of the first video processing pipeline and the activated remaining portion of the first video processing pipeline exclusively when the first video signal is provided for display and the second video signal is passed to the activated at least the portion of the second video processing pipeline and the activated remaining portion of the second video processing pipeline exclusively when the second video signal is provided for display.

11. The method of claim 9, wherein the first video signal is acquired from a first signal source and the second video signal is acquired from a second signal source that is different from the first signal source.

12. The method of claim 9, wherein acquiring the first video signal and the second video signal comprises locking-in the first video signal and the second video signal.

13. The method of claim 9, wherein switching from providing the first video signal for display to providing the second video signal for display by passing the second video signal through the activated at least the portion of the second video streaming pipeline and the activated remaining portion of the second video processing pipeline further comprises switching from providing the first video signal for display to providing the second video signal for display by passing the second video signal through the activated at least the portion of the second video streaming pipeline and the activated remaining portion of the second video processing pipeline and stopping the passing the first video signal through the at activated at least the portion of the first video processing pipeline and the activated remaining portion of the first video processing pipeline, the activated remaining portion of the first video processing pipeline being switched off or placed in the idle mode.

14. The method of claim 9, wherein the first video signal comprises a first program of a signal source and the second video signal comprises a second program of the signal source.

15. The method of claim 9, further comprising:
detecting content in the first video signal; and
initiating the switching in response to detecting the content.

16. The method of claim 15, wherein the content comprises an advertisement.

17. A computer program product comprising instructions stored in at least one non-transitory computer-readable storage medium, the instructions comprising:

instructions for acquiring a first video signal and a second video signal;

instructions for maintaining active at least a portion of a first video processing pipeline for processing the first or second video signals for display in a first window, a remaining portion of the first video processing pipeline being off or in an idle mode and maintaining active at least a portion of a second video processing pipeline for processing the first or second video signals for display in a second window a remaining portion of the second video processing pipeline being off or in an idle mode;

instructions for providing the first video signal for display in the first window and the second video signal for display in the second window by passing the first video signal through the maintained active at least the portion of the first video processing pipeline and an activated remaining portion of the first video processing pipeline, and passing the second video signal through the maintained active at least the portion of the second video processing pipeline and an activated remaining portion of the second video processing pipeline; and instructions for switching to providing the second video signal for display in the first window and the first video signal in the second window by passing the second video signal through the maintained active at least the portion of the first video processing pipeline and the activated remaining portion of the first video processing pipeline, and passing the first video signal through the maintained active at least the portion of the second video processing pipeline and the activated remaining portion of the second video processing pipeline.

18. The computer program product of claim 17, wherein the first video signal is acquired from a first signal source and the second video signal is acquired from a second signal source that is different from the first signal source.

19. The computer program product of claim 17, the instructions further comprising:
instructions for detecting content in the first video signal independent of metadata of the first video signal; and
instructions for initiating the switching in response to detecting the content.

20. The computer program product of claim 19, wherein the content comprises an advertisement.

* * * * *